July 9, 1957  R. W. HEER  2,798,676
SPLIT SHELL FOR ROLL CRUSHER
Filed Aug. 4, 1954
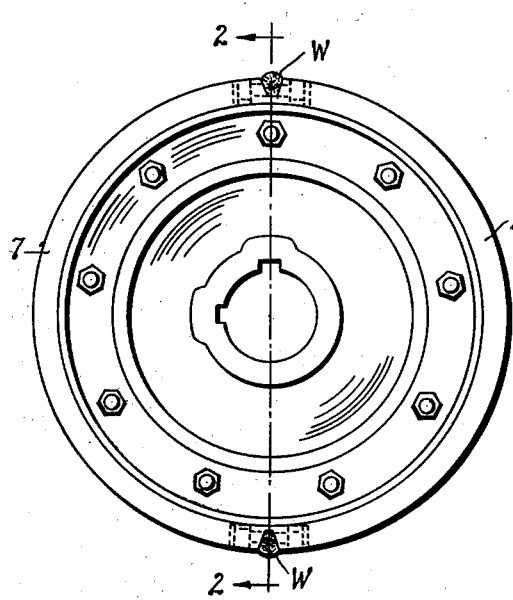
FIG. 1.
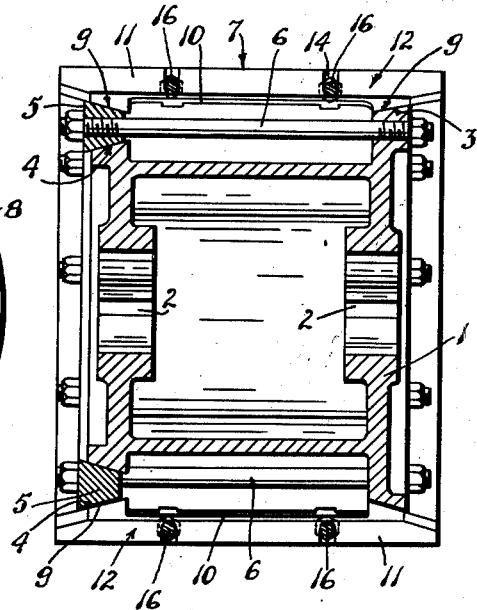
FIG. 2.
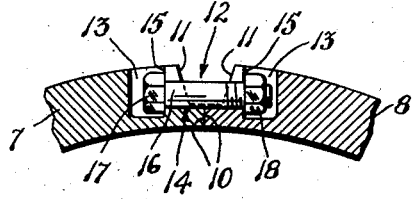
FIG. 3.
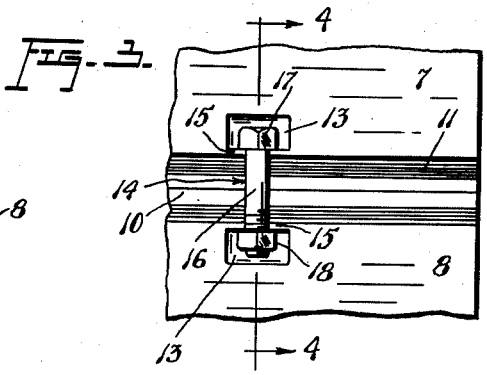
FIG. 4.
INVENTOR
Ralph W. Heer
BY 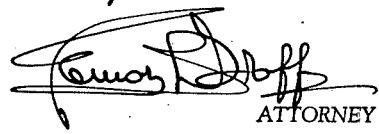
ATTORNEY

2,798,676
SPLIT SHELL FOR ROLL CRUSHER

Ralph William Heer, Minneapolis, Minn., assignor, by mesne assignments, to Poor & Company, Chicago, Ill., a corporation of Delaware Application August 4, 1954, Serial No. 447,802

3 Claims. (Cl. 241—294)

This invention relates to roll crushers, and more particularly to a split shell assembly which may be applied without removing the hub from the crusher frame.

One of the difficulties in connection with roll crushers is that the roll surface becomes worn, and from time to time requires replacement. While split or segmented shells have heretofore been made, nevertheless the sections or segments have been held together either by mechanical means alone or by welding alone. When mechanical fasteners such as bolts, clamps and the like have been used, the shells stretch and become loose on the hub and the fasteners are also loosened thus destroying the efficiency of the shell itself. On the other hand, when the sections or segments have been merely welded together, the repair becomes very laborious and time consuming in the respect that it is difficult to clamp the shell to the hub while the welding is being accomplished. Accordingly, the present invention proposes a combination of mechanical and welding holding means which has the advantage that the sections or segments can be readily held in place initially by suitable fastenings and then the welding may be facilitated to unite the sections in integral relation.

One of the objects of the invention is to provide a roll crusher comprising a plurality of sections, said sections provided at their meeting edges with fastening means for initially clamping them about the hub and thus hold the sections in place to facilitate their permanent union by an appropriate weld. The fastenings may be removed and the welding material flowed in the welding groove as well as in the fastening cavities, or, alternatively the fastenings may be left in place and embedded in the weld.

With the above and other objects in view which will more readily appear as the nature of the invention is better understood, the same consists in the construction hereinafter illustrated, described, and claimed.

A preferred and practical embodiment of the invention is shown in the accompanying drawings, in which:

Figure 1 is a side elevation of the improvements described herein.

Fig. 2 is a vertical sectional view taken at right angles to Fig. 1, the weld being omitted.

Fig. 3 is a fragmentary top plan view illustrating the joint.

Fig. 4 is an enlarged detail fragmentary elevation of the joint between the sections.

Similar reference characters designate corresponding parts throughout the several figures of the drawing.

As will be seen from the drawings, the roll crusher assembly includes a hub 1 having a central bore 2 for receiving the operating shaft which is driven in the usual manner. The hub 1 is provided with the permanent wedge surface 3 at one side and also with a permanent wedge surface 4 at the opposite side which is of less diameter than the wedge surface 3. The wedge surface 4 is intended to cooperate with a wedge ring 5 which is moved by the bolt fastenings 6 in order to cooperate with the wedge surfaces 3 to tightly hold the assembled shell sections 7 and 8 to the hub.

Referring to the sections 7 and 8, it will be understood that while two sections are shown by way of example, any number of sections may be employed if desired embodying the features about to be described.

Each shell section is provided with an inclined face 9 at its inner side for cooperating respectively with the wedge surface 3 of the hub and wedge ring 5. Also each section is provided with the radial wall portions 10 of less length than the thickness of each section, said portions intended to be drawn in abutting relation when the sections are finally adjusted on the hub. The wall portions 10 communicate with outwardly flared wall portions 11 which together form a welding groove or channel 12 extending transversely across and between each section.

At either side of the welding groove or channel 12, each section is provided at spaced intervals with substantially tangential fastening receiving cavities 13 which communicate with each other by a transverse slot 14 which extends across the groove, said slots 14 each forming a fastening shank receiving cavity which interrupts the groove 12 at selected locations.

The arrangement just described, that is, the cavities or sockets 13 and slots 14 are so arranged as to provide abutment portions 15 against which the head and nut of the fastening bolt may operate to draw the edges of the sections together to effect initial assembly about the hub.

For example, suitable bolts, including a shank 16 are fittted into the transverse slots 14 so that the heads 17 lie in one socket 13 and the bolts 18 lie in the socket 13 of the opposite section. It will thus be seen that the initial fastenings can be put in place and the nuts 18 turned on the shanks of the bolts so that the sections may be drawn together with their wall portions 10 in abutting relation. Thus, the shell sections may then be held about the hub to conveniently be welded together.

The groove 12 may then be supplied with suitable welding material throughout its length, and, likewise, if it is desired to leave the fastenings in place, the welding material will fill the sockets 13 and the cavities 14 and completely embed the fastenings in the material of which the weld W is formed. In the event the fastenings are removed, the welding material still fills the groove and the fastening receiving cavities. The weld W, therefore, permanently and securely unites the sections 7 and 8 in integral relation, thereby completing the installation of the new roll surface.

In practice when it is desired to use the present invention, the old one-piece roll surface is appropriately cut while the hub 1 remains on its operating shaft. The bolts 6 may be loosened so that the wedge ring 5 will be freed sufficiently to admit of the old surface being removed and the sections of the invention being applied, in situ on the field, by assembling the sections about the wedge surface 3 and the wedge ring 5 and initially connecting them by the fastenings 16, 17 and 18. The latter are then made tight to draw the sections together and the wedge ring 5 is drawn into place by the bolts 6. The weld is then formed in the channel or groove 12, and, also, in the sockets and cavities as previously described to complete the new installation.

From the foregoing it will be seen that the present invention obviates the objections incident to merely bolting the sections in place without welding, and at the same time makes it possible to have the advantage of welded sections without the difficulty in supporting them about the hub while they are welded.

Without further description it is thought that the features and advantages of this invention will be readily apparent.

I claim:

1. A split shell for roll crushers, comprising, in combination, a plurality of shell sections each having longitudinally disposed edges whose inner portions are radial to the axis of the shell for abutting engagement and whose outer portions flare outwardly to provide a welding groove, said edges also having countersunk bolt-head and nut-receiving cavities located at either side of the groove and connected by a bolt shank receiving groove disposed transversely of the welding groove, nuts and bolts fitted in said cavities and the shank-receiving grooves to initially clamp the sections together while being welded, and a weld formed in said welding groove to permanently unite said sections.

2. A split shell for roll crushers, comprising, in combination, a plurality of shell sections for assembly about a hub mounted on a shaft, said sections having abutting transversely disposed edge portions formed to provide a related groove extending transversely across the face of the shell, means located within the surfaces defining the inner and outer faces of said sections and disposed crosswise of said groove for holding said sections about the hub, and a weld in said groove.

3. In a split shell for roll crushers, the combination with a hub mounted on a shaft, of a plurality of shell sections for assembly about said hub, said sections having complementary walls at their related abutting axial edges providing welding grooves extending transversely of the shell, said walls being disposed to have their maximum spacing at the exposed faces of the adjacent shell sections, fastening means engaging adjacent shell sections to hold them assembled about the hub, said fastenings being located between the inner and outer faces of said shell sections and disposed across and within said grooves, and a weld formed within said groove for uniting said sections.

References Cited in the file of this patent

UNITED STATES PATENTS

| 1,410,546 | Battey | Mar. 28, 1922 |
| 1,446,274 | Roberts | Feb. 20, 1923 |
| 1,654,037 | Clark | Dec. 27, 1927 |
| 1,771,739 | Wise | July 29, 1930 |
| 2,219,085 | Watson | Oct. 22, 1940 |
| 2,294,098 | Stromer | Aug. 28, 1942 |
| 2,610,554 | Stuck | Sept. 16, 1952 |
| 2,638,722 | Rimmel | May 19, 1953 |

FOREIGN PATENTS

| 394,430 | Great Britain | June 29, 1933 |
| 507,971 | Great Britain | June 23, 1939 |